(No Model.)
J. MAXHEIMER.
FEED CUP FOR BIRD CAGES.
No. 252,611.            Patented Jan. 24, 1882.
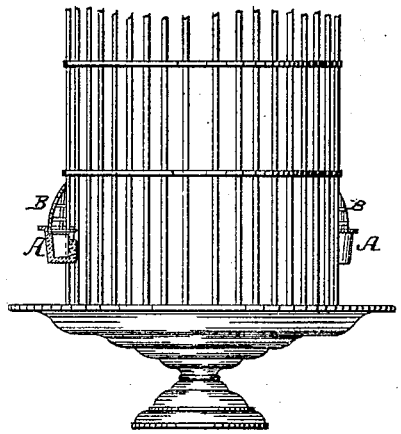
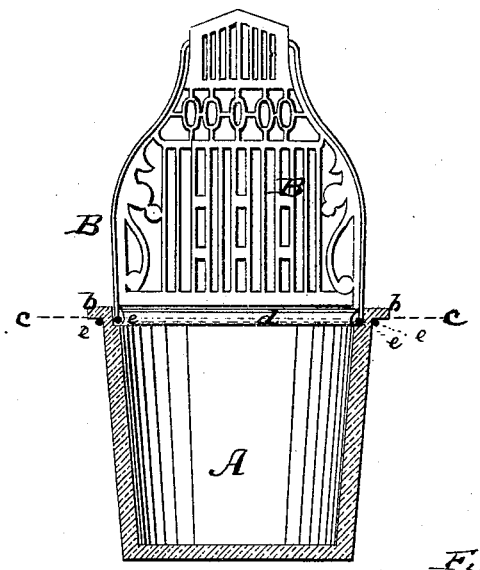
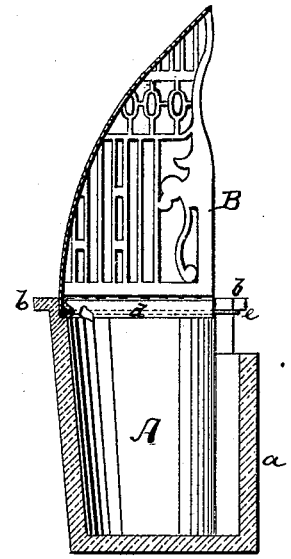
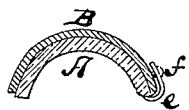
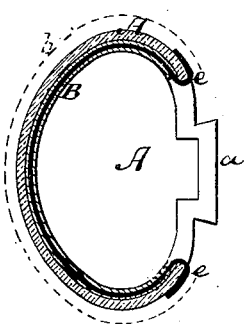
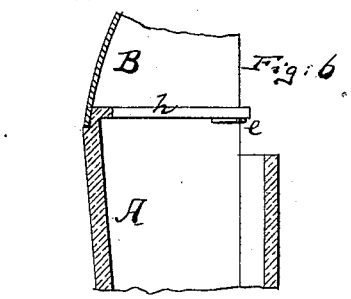
Witnesses:
John C. Tunbridge
John M. Speer
Inventor:
John Maxheimer
by his attorneys
Briesen & Betts

UNITED STATES PATENT OFFICE.

JOHN MAXHEIMER, OF BROOKLYN, NEW YORK.

FEED-CUP FOR BIRD-CAGES.

SPECIFICATION forming part of Letters Patent No. 252,611, dated January 24, 1882.

Application filed November 15, 1881. (No model.)

*To all whom it may concern:*

Be it known that I, JOHN MAXHEIMER, of Brooklyn, in the county of Kings and State of New York, have invented an Improvement in Feed-Cups for Bird-Cages, of which the following is a specification.

Figure 1 is a side view, partly in section, of a bird-cage having a feed-cup of my construction. Fig. 2 is an inner face view, partly in section, of the feed-cup; Fig. 3, a vertical central section of the same; and Fig. 4, a horizontal section thereof on the line *c c*, Fig. 2. Figs. 5 and 6 represent modifications.

This invention has for its object so to construct feed-cups of cages and the shields that are applied to their upper portions as to facilitate the cages being packed properly together in transportation and firmly united for use.

Heretofore there were in practical use two kinds of feed-cups. In one kind the feed-cup has a sheet-metal hood attached to it, which hood is placed over a flange of the cup, making thereby a costly connection. Moreover, the hood darkens the opening to the feed-cup, and it has frequently happened that birds were starved to death, though their feed-cups were full, because the dark hoods prevented them from observing or venturing to the food. The other construction in common use consists of a plain feed-cup without a hood, fitted into a cage that has a swinging shield, which shield, when the cup is in position, swings over the cup to prevent the escape of the bird. The difficulty with these structures is that the "cage-balloons," as the wire portions of the cages are called, cannot be nested for transportation, the shields which are secured to them being in the way of nesting.

My invention consists principally in combining the feed-cup with a separately-made hood or shield and with folding prongs or wires for uniting the two into one structure, all as hereinafter more fully described.

In the drawings, the letter A represents the feed-cup. The same may be of oval or circular form and provided with a dovetailed projection, *a*, as in Fig. 4, for fastening it to the balloon of the cage; but nothing herein contained is intended to claim anything as to the hanging of the cup to the cage or to limit me to any form of connection for that purpose.

In the example shown in Figs. 2 and 3 the cup A has an outwardly-projecting flange, *b*, which surrounds it on all sides excepting the side that faces the cage, where the feed-opening is made. B is the shield or hood, which may be made of perforated sheet metal having suitable ornamentation, but which is preferably made of glass or otherwise transparent, so that it will admit light to the feed-opening of the cup A. In the example which is shown in Figs. 2, 3, 4 of the drawings this shield B sets with its lower end in a recess, *d*, which is formed in the inner side of the upper part of the cup A, and thus the shield is properly supported at its lower and outer sides in the cup A.

To the front edges of the shield B, at the proper height, are secured two projecting wires or flexible plates, *e*, which, when the shield is in place on the cup, are bent over the edges of the cup and beneath the flange *b*, as is clearly indicated in Figs. 3 and 4, the dotted line in Fig. 4 showing the position of the flange. Thus the connection between the cup and shield is easily obtained by folding the projecting wires around the edges of the cup, beneath the flange. It is quite clear, however, that the invention may be modified by having the flexible bands *e* on the cup A and bending them over a portion of the shield B, which construction would be a modification of my invention and not a departure therefrom in substance. Thus in Fig. 5 is shown a diagram illustrating at A a portion of the cup, at B the shield placed on a shoulder on the outer side of the cup.

*e* is one of the flexible wires or bands projecting from the edge of the cup A and folded over a projecting button, *f*, of the shield. The wires *e* or flexible bands may be fastened to the part from which they project either by being attached thereto in suitable manner, or they may be secured in the glass or substance of the cup or shield while the said cup or shield is being formed into shape.

It is not necessary that the shield B should set into the cup, as indicated in Fig. 3, as it may also be made to rest on an outer shoulder, such as indicated in the diagram marked Fig. 6, when said shoulder is formed on the outer side of the cup. In this position the parts may be connected, either as indicated in Fig.

5—to wit, by securing the wires or bands e to the cup—or, as indicated in Fig. 6, by securing them to the shield and folding them under an inwardly-projecting shoulder, h, of the cup. Thus it will be seen that for the purposes of receiving the locking bands or wires e the flange b, buttons f, and flange h are equivalents, their purpose being to receive the bent wire or band e, and thereby to prevent the separation of the parts A and B.

I claim—

1. The feed-cup A, combined with the shield B and flexible wires or bands e, and with a projection or projections which, together with said wires or bands, will insure the connection of the parts A and B, substantially as described.

2. The feed-cup A, constructed with inner recess, d, and outwardly-projecting flange b, in combination with the detachable shield B and flexible wires or bands e, substantially as described.

3. In a bird-cage, a feed-cup provided with a separable partly or wholly transparent shield, B, and with bands e for uniting the two into one portable structure, substantially as described.

4. The feed-cup A, provided with recess d and combined with the partly or wholly transparent shield B, which is set into said recess and firmly united to said cup into one structure, substantially as herein shown and described.

JOHN MAXHEIMER.

Witnesses:
WILLY G. E. SCHULTZ,
WILLIAM H. C. SMITH.